United States Patent [19]

Wishart

[11] 4,225,028
[45] Sep. 30, 1980

[54] SELF-ADJUSTING RELEASE MECHANISM WITH ADJUSTMENT LIMITING MEANS

[75] Inventor: George L. Wishart, N. Syracuse, N.Y.

[73] Assignee: Lipe-Rollway Corporation, Syracuse, N.Y.

[21] Appl. No.: 957,547

[22] Filed: Nov. 3, 1978

[51] Int. Cl.² .................. F16D 13/75; F16D 13/54
[52] U.S. Cl. .................................................. 192/111 A
[58] Field of Search ............ 192/111 A, 70.25, 111 R; 188/196 BA, 79.5 GE

[56] References Cited

U.S. PATENT DOCUMENTS

| 3,876,049 | 4/1975 | Linn et al. ...................... 192/111 A |
| 4,071,118 | 1/1978 | Johannesen ..................... 192/70.25 X |

Primary Examiner—Philip C. Kannan
Attorney, Agent, or Firm—Bruns & Jenney

[57] ABSTRACT

A friction clutch having a known type of self-adjusting release mechanism is provided with means for preventing adjustments caused by extraneous forces rather than disc wear. In the known mechanism, adjustment is effected by a pair of ring members carried by the release mechanism, one of the ring members being rotatable relative to the other in response to disc wear to effect the compensating adjustment. The invention provides coacting means on the two ring members operable by centrifugal force to lock the members together at engine idle speed whereby adjustments induced by extraneous forces rather than actual disc wear are prevented.

4 Claims, 7 Drawing Figures

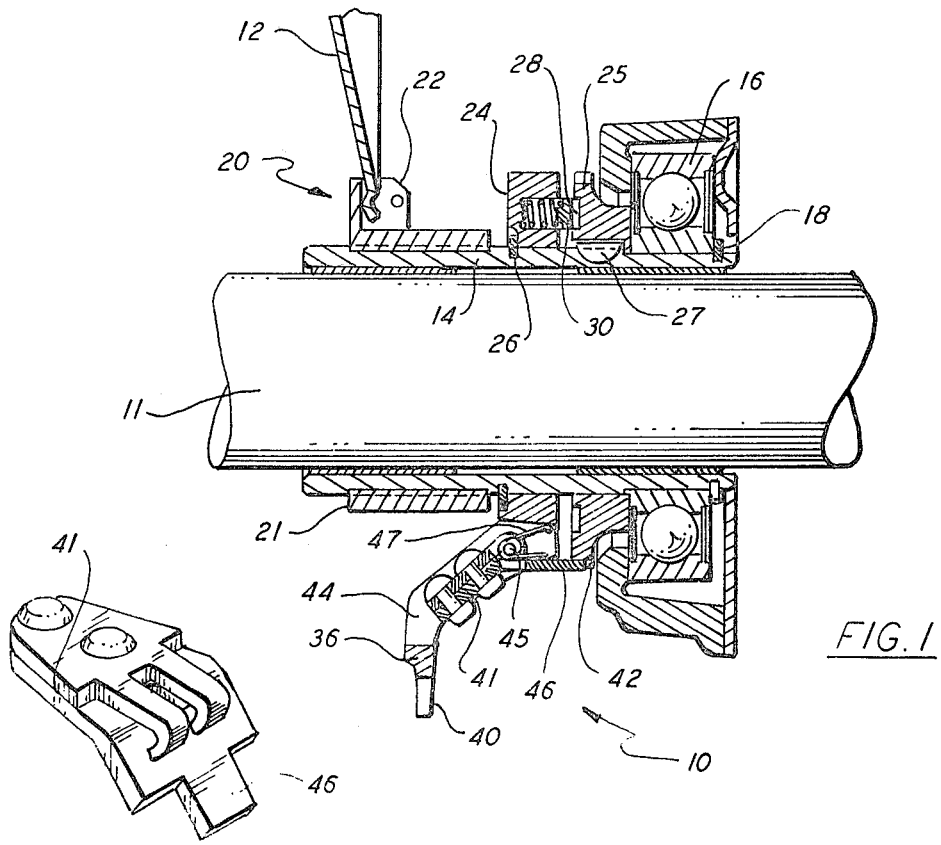
FIG. 1
FIG. 7
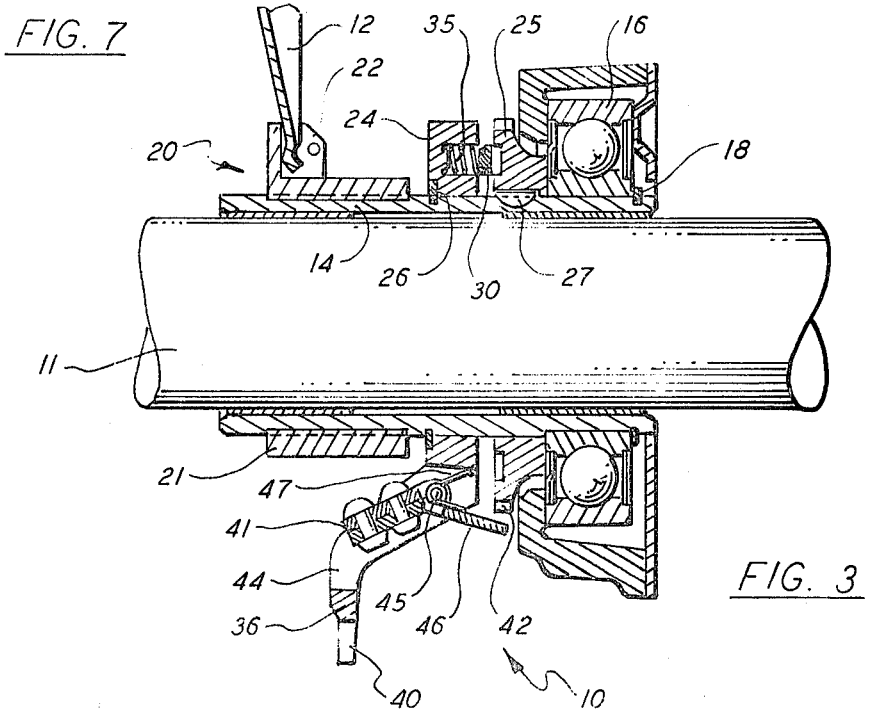
FIG. 3

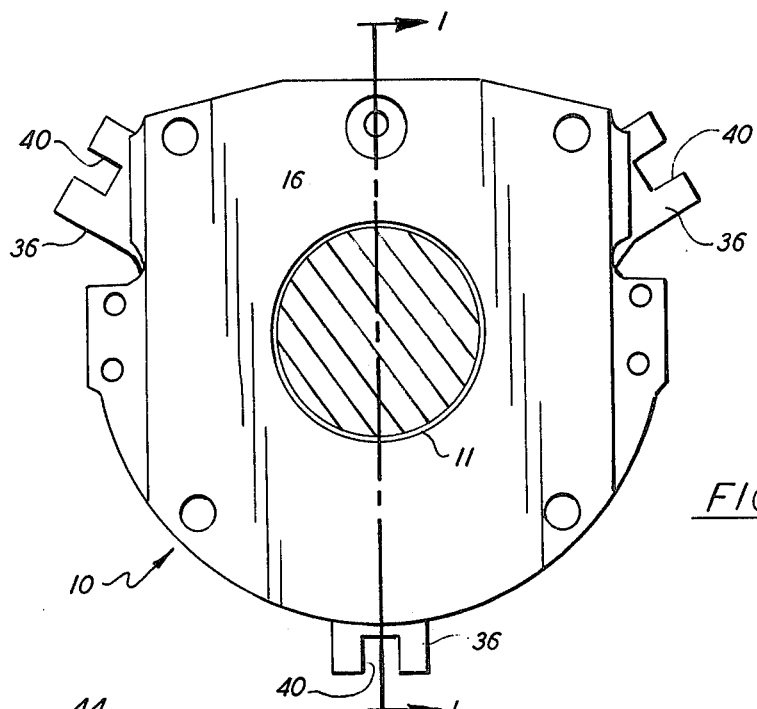
FIG. 2
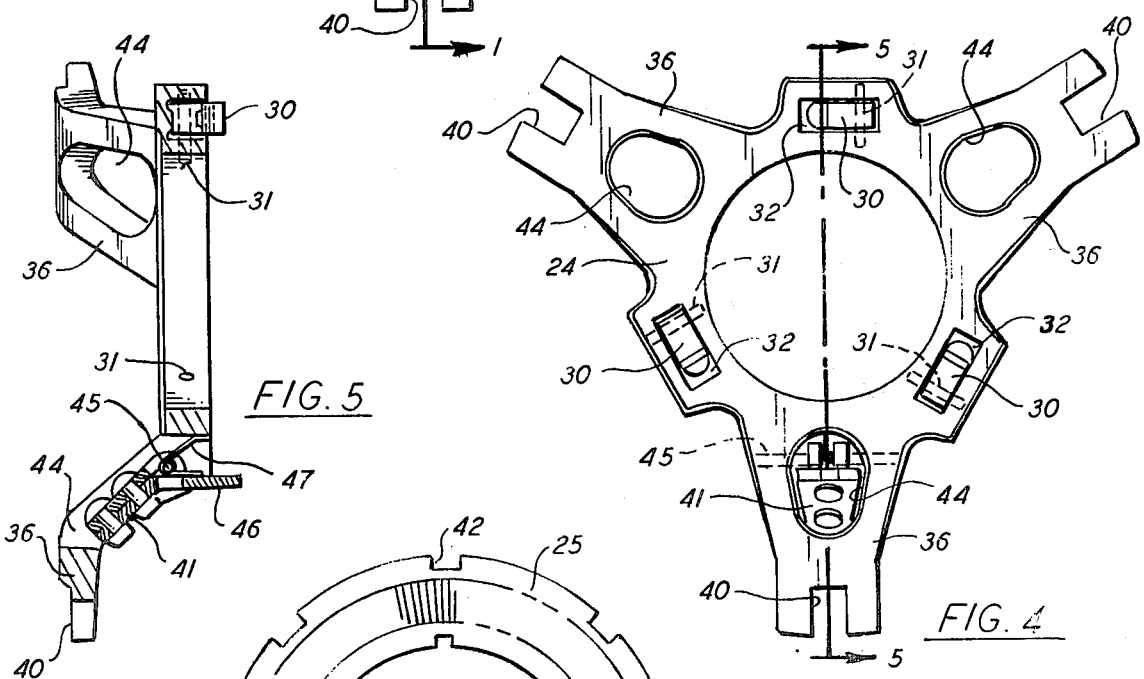
FIG. 5
FIG. 4
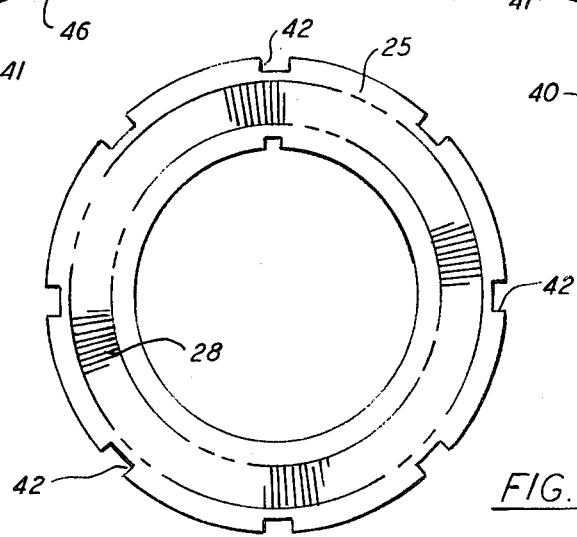
FIG. 6

SELF-ADJUSTING RELEASE MECHANISM WITH ADJUSTMENT LIMITING MEANS

BACKGROUND OF THE INVENTION

This invention relates generally to clutch release or throwout mechanisms, and more particularly to a known type of self-adjusting release mechanism that automatically compensates for friction disc facing wear. Specifically, the present invention is an improvement on the self-adjusting release mechanism disclosed in U.S. Pat. No. 3,876,049, granted Apr. 8, 1975 to Donald F. Linn and George L. Wishart and assigned to the assignee of this application.

In using the invention disclosed in U.S. Pat. No. 3,876,049 it has been found that under certain circumstances if the vehicle clutch pedal is stroked while the engine is idling, there may be an automatic adjustment in the release mechanism, even though such is not induced by wear on the disc facings. These unwanted adjustments or over-adjustments are caused by various extraneous forces resulting from the dynamic condition of the engine, and they render the self-adjusting mechanism less precise and effective than it was designed to be.

SUMMARY OF THE INVENTION

The present invention resolves the problem noted just above by preventing any adjustment to take place at engine idle speed whereby, as a practical matter, the self-adjusting mechanism only functions when the engine is not running and the clutch pedal is stroked. In the release mechanism of the cited patent, adjustment is effected by a pair of ring members carried by the release mechanism, one of the ring members being rotatable relative to the other in response to disc wear to effect the compensating adjustment.

The invention provides coacting means on the two ring members operable by centrifugal force to lock the members together at engine idle speed whereby adjustments caused by extraneous forces rather than actual disc wear are prevented. The coacting means comprises a latch on one of the ring members and a plurality of circumferential notches in the other, the latch being operable to move into engagement with one of the notches when the speed of the driving shaft is above a predetermined threshold speed.

BRIEF DESCRIPTION OF THE DRAWINGS

FIG. 1 is a vertical section through the clutch release mechanism of the invention, the section being on line 1—1 of FIG. 2;

FIG. 2 is a rear elevation of the release mechanism;

FIG. 3 is a view corresponding to FIG. 1 but showing the latch in unlatched or disengaged position;

FIG. 4 is a rear elevation of the pawl and latch carrying adjustment member;

FIG. 5 is a vertical section taken on line 5—5 of FIG. 4;

FIG. 6 is a front elevation of the adjustment member with the ratchet teeth; and FIG. 7 is an enlarged perspective view of the latch.

DESCRIPTION OF THE PREFERRED EMBODIMENT

Referring now to the drawings, the self-adjusting release mechanism that is shown is the same as that disclosed in U.S. Pat. No. 3,876,049, cited above. Accordingly, reference may be had to that patent for a detailed description of the construction and operation of the mechanism.

The release mechanism, generally indicated at 10, is mounted for axial sliding movement on the driven or output shaft 11 and the inner (forward) end of the mechanism is in engagement with release levers 12 for actuation of same. The mechanism shown is for a pull type clutch meaning that it must be moved rearwardly or to the right in FIG. 1 to disengage the clutch. Such movement operates through the release levers to move the pressure plate (not shown) rearwardly and causes the driving connection between the driving and driven members to be disengaged.

Briefly, the release mechanism includes a first or inner sleeve 14, a release bearing 16 and a release lever spider 20 threaded on sleeve 14 adjacent its forward end. The spider comprises a sleeve 21 and a plurality of circumferentially spaced lugs 22 for receiving the inner ends of the release levers 12. Adjustment for disc facing wear is carried out by a pair of adjustment effecting members 24 and 25 mounted on the inner sleeve 14.

Member 24, which is generally ring shaped, normally abuts against a retaining ring 26 but can move axially in the other direction relative to the sleeve 14 and can also move rotationally relative thereto. Adjustment effecting member 25, also ring shaped, is spaced from member 24 as shown and is nonrotatably connected to sleeve 14 by a key 27. On its rear side, member 25 abuts against the inner race of the release bearing 16.

The forward face of member 25 is formed with a ring of ratchet teeth 28, FIGS. 1 and 6. Ratchet teeth 28 are engaged by a plurality of pawls 30 carried by the adjustment effecting member 24, there being three such pawls in the embodiment shown, see FIG. 4. The pawls 30 are pivotally mounted at 31 in recesses 32 in the member 24, and are biased by springs 35, FIG. 3, into engagement with the ratchet teeth.

Extending forwardly and outwardly from the front side of adjustment effecting member 24 are three circumferentially spaced arms 36, FIGS. 1, 3 and 4. The outer ends of arms 36 abut against the clutch cover (not shown), and relative rotation between the member 24 and cover is prevented by rearwardly projecting cover mounted dowels (not shown) that are received in notches 40 in the arms 36.

In normal operation of the release mechanism, without consequential wear on the driven disc facings, disengagement of the clutch is as follows: Release mechanism 10 is moved to the right, FIG. 1, or rearwardly by a clutch pedal actuated yoke (not shown). The yoke pull is transmitted through the release bearing 16, a retaining ring 18 and sleeve 14 to the spider 20 whereby the release levers are actuated to disengage the clutch. When the clutch pedal is released, the release mechanism will be returned to its starting position in the conventional manner to reengage the clutch.

When the wear on the disc facings is no longer inconsequential so that adjustment is required, the adjustment is automatically made during re-engagement of the clutch, or as the release mechanism moves forwardly (to the left in FIG. 1). Thus, when the release levers 12 reach their starting position, the arms 36 on the adjustment effecting member 24 contact the clutch cover and prevent further forward movement of the member. Due to the wear, however, the pressure plate and attached release levers are able to move farther forward toward the flywheel and are strongly urged to do so by the usual pressure springs (not shown) acting on the pressure plate. This causes the free ends of the release levers to continue to urge spider 20 forward beyond its starting position.

The further forward movement of spider 20 is transmitted through sleeve 14, retaining ring 18 and the inner race of bearing 16 to the adjustment effecting member 25. Since member 24 is held by arms 36 against further movement, the forward movement of member 25 causes the space between the two members to decrease and this in turn causes the pawls 30 on member 24, FIGS. 1 and 3, to be pushed farther into their recesses causing the free ends thereof to pivot slightly. This operates to rotate the member 25 by reason of the engagement of the pawls with the ratchet teeth. The rotation of member 25 is relative to member 24 which is held against rotation by the engagement of the arms 36 with the cover.

The rotation of member 25 is transmitted through key 27 to sleeve 14 whereby the latter rotates relative to spider 20. Spider 20 is prevented from rotating with the sleeve 14 because of its engagement with the release levers 12. The relative rotation between the sleeve and spider has the effect of increasing the distance between the spider and release bearing and this in turn permits the spider, release levers and pressure plate to assume a position (when the clutch is engaged) closer to the flywheel, thereby compensating for the wear. After the rotation of the sleeve relative to the spider, the spacing between members 24,25 is restored to its original distance which is maintained by springs 35 until further wear on the disc facings reaches the point where another adjustment is called for.

As pointed out hereinbefore, it has been found that under certain circumstances if the vehicle clutch is stroked while the engine is idling, there may be an automatic adjustment in the release mechanism even though such is not induced by consequential wear on the disc facings. These unwanted adjustments or over-adjustments are caused by various extraneous forces resulting from the dynamic condition of the engine. To eliminate this problem, the present invention provides means for preventing any adjustment to take place at engine idle speed whereby, as a practical matter, the self-adjusting mechanism only functions when the engine is not running and the clutch pedal is stroked.

The adjustment preventing means of the invention comprises one or more latches 41 carried by the adjustment effecting member 24 and a plurality of uniformly spaced notches 42, FIGS. 1, 3 and 6, in the circumference of the adjustment member 25. Engagement of the latch with any one of the notches prevents relative rotation between members 24 and 25 and thus prevents any adjustment in the release mechanism. In the embodiment of the invention shown, there is one latch 41 positioned in an opening 44 in one of the arms 36 of the member 24. Since each of the arms has such an opening, FIG. 4, up to three latches can be employed.

Latch 41 is rockably mounted on a pin 45 that spans the opening 44 and has a rearwardly projecting dog 46, FIG. 7, that is adapted to enter a notch 42. The mass of the latch is substantially greater at its forward end than at its rear end so that there is a tendency for the latch to rock in a counterclockwise direction on the pin 45. This tendency is overcome under static conditions by a torsion spring 47, the spring holding the latch dog 46 out of engagement with the periphery of adjustment member 25 when the engine is not running as shown in FIG. 3.

When the engine is idling, the driving shaft and clutch as a whole are turning and the speed is sufficient to cause latch 41 to be rocked by centrifugal force in the counterclockwise direction overcoming the bias of spring 47 as shown in FIG. 1. If, when this happens, the latch dog 46 is not opposite one of the notches 42 it will abut against the periphery of adjustment member 25 between a pair of notches until some relative rotation between members 24 and 25 occurs at which time the dog will enter the next notch to it. In the embodiment disclosed there are eight notches, FIG. 6, angularly spaced 45 degrees apart which means that when the engine is idling the maximum amount of relative rotation that can occur is something less than 45 degrees.

When the engine is stopped, there ceases to be any centrifugal force acting on latch 41 and spring 47 rocks the latch out of engagement with adjustment member 25 as shown in FIG. 3. Stroking the clutch pedal at this time will then result in any adjustment that may be necessary to compensate for actual disc facing wear.

From the foregoing description it will be apparent that the invention provides an improved and very advantageous self-adjusting release mechanism. As will be understood by those familiar with the art, the invention may be embodied in other specific forms without departing from the spirit or essential characteristics thereof.

I claim:

1. In a friction clutch for connecting driving and driven shafts, the clutch having means for normally effecting a driving connection between the shafts and a release mechanism axially slidable on the driven shaft for disengaging said driving connection, the release mechanism including first and second adjustment effecting members one of which is rotatable with respect to the other to compensate for wear occurring in the driving connection; the improvement comprising means for preventing relative rotation between the adjustment effecting members when the speed of the driving shaft is in excess of a predetermined number of r.p.m.'s, said prevention means including means rockably connected to one of the adjustment effecting members and movable by centrifugal force into latching engagement with the other member.

2. A friction clutch as defined in claim 1 wherein the means rockably connected to one of the adjustment effecting members is a latch, the other of the adjustment effecting members having a plurality of notches, the latch being moved into engagement with one of said notches when the driving shaft speed exceeds a predetermined number of r.p.m.'s.

3. A friction clutch as defined in claim 2 together with spring means for biasing the latch out of engagement with the notches, the spring bias being overcome by centrifugal force when the driving shaft speed exceeds a predetermined number of r.p.m.'s.

4. A friction clutch as defined in claim 2 wherein the latch is weighted in such a manner as to aid the centrifugal force in moving it into latching engagement with the other adjustment effecting member.

* * * * *